United States Patent [19]
Hartmann et al.

[11] 4,349,773
[45] Sep. 14, 1982

[54] CIRCUIT FOR PROTECTING STORAGE CELLS

[75] Inventors: Bernd Hartmann; Henner Meinhold, both of Sandhausen, Fed. Rep. of Germany

[73] Assignee: Brown, Boveri & Cie Aktiengesellschaft, Mannheim, Fed. Rep. of Germany

[21] Appl. No.: 212,460

[22] Filed: Dec. 3, 1980

[30] Foreign Application Priority Data

Dec. 4, 1979 [DE] Fed. Rep. of Germany ....... 2948700

[51] Int. Cl.³ .................... H01M 10/44; H02J 7/00
[52] U.S. Cl. ............................... 320/5; 320/6; 320/15; 320/36; 320/43
[58] Field of Search ............... 320/2, 3, 5, 6, 15–18, 320/35, 36, 39, 43, 46, 47, 21

[56] References Cited

U.S. PATENT DOCUMENTS

| | | | |
|---|---|---|---|
| 3,102,222 | 8/1963 | Harmer | 320/15 X |
| 3,221,239 | 11/1965 | Langer et al. | 320/17 |
| 3,343,058 | 9/1967 | Deschamp et al. | 320/17 |
| 3,348,117 | 10/1967 | Howden | 320/18 |
| 3,393,355 | 7/1968 | Whoriskey et al. | 320/18 |
| 3,496,442 | 2/1970 | Carlisle | 320/18 |
| 3,689,776 | 9/1972 | Evans | 320/15 X |
| 4,061,955 | 12/1977 | Thomas et al. | 320/15 X |
| 4,303,877 | 12/1981 | Meinhold | 320/6 |

FOREIGN PATENT DOCUMENTS 698137 11/1964 Canada .................. 320/17

Primary Examiner—A. D. Pellinen
Attorney, Agent, or Firm—Herbert L. Lerner; Laurence A. Greenberg

[57] ABSTRACT

Circuit for the uniform charging and discharging of electrochemical storage cells of the alkali metal and chalcogen type having a protective element in the circuit. The protective element is a container filled with a chemical compound which easily dissociates and easily recombines. The outer surface of the container forms an anode. An electrically conducting rod which forms a cathode extends into and also out of the container, and is electrically insulated in its mounting.

12 Claims, 4 Drawing Figures

CIRCUIT FOR PROTECTING STORAGE CELLS

CROSS REFERENCE TO RELATED APPLICATION

The following application, assigned to Brown, Boveri & Cie, Aktiengesellschaft, a German corporation doing business at Mannheim, West Germany, the assignee of the present application is hereby incorporated by reference; Application Ser. No. 035,270, filed May 1, 1979, now U.S. Pat. No. 4,303,877.

BACKGROUND OF THE INVENTION

1. Field of the Invention

The invention relates to the uniform charging and discharging of electrochemical storage cells series-connected, or of groups of several parallel-connected storage cells series-connected to form a battery of the alkali metal and chalcogen type with at least one anode space for the accommodation of the anolyte and one cathode space for the accommodation of the catholyte, both spaces separated from each other by an alkali ion-conducting solid-electrolyte wall. More particularly, the present invention relates to a circuit with a protective element to effect uniform charging and discharging of electrochemical storage cells.

2. Description of the Prior Art

The subject of related application, U.S. Pat. No. 4,303,877 and corresponding German application No. P 28 19 584.8, is a circuit for the uniform charging and discharging of electrochemical storage cells which are either in series combined to form a battery, or in groups of several parallel-connected storage cells. The cells are constructed on the basis of employing alkali metal and chalcogen with at least one anode chamber for receiving the anolyte, and one cathode chamber for receiving the catholyte, which are separated from each other by an alkali ion-conducting wall of solid electrolyte. To each storage cell connected in series, or to each group of storage cells at least one protective element is connected in parallel which bridges (by-passes) their current flow when reaching a predetermined, maximal charging- or discharging level of the storage cell(s), and which is in connection with a control switch which is directly conductively connectible with the negative and positive electrodes of these storage cell(s) and the electrical connecting poles. The protective element is directly connected to the two electrical connecting poles, and the storage cell(s) is (are) at least connected to one of the two electrical connecting poles through a switch.

Such rechargeable electrochemical storage cells are very well suited for the construction of accumulators of high density energy and power. For example, the electrolyte of $\beta$-aluminum oxide used at sodium/sulfur-storage cells allows only sodium ions to pass. This means, in contrast to the lead-accumulator, that practically no self-discharging can occur, and no side reactions take place, as, for example, a water decomposition at the lead/lead oxide system. Therefore, the current output, i.e. the Faraday-efficiency of a sodium/sulfur-storage cell is almost 100%.

In operation, these advantages are opposed by the disadvantage that such cells must not be overcharged or over-discharged (discharged in excess), as can be done with lead accumulators. The total capacity is determined by the cell with the lowest capacity, especially in a series circuit of cells. Especially important is the fact that when storage cells with a different charging state are placed in a series combination with others, for example, they can never be synchronized with the others in the line. With lead-accumulators it is possible to bring all cells to the same state by over-charging-hydrogen-/oxygen formation (equalizing charge). To counteract this differently charged state of the storage cells of a battery, first several storage cells are connected in parallel, before several such groups of parallel-connected cells are connected in series. A further disadvantage of these electrochemical storage cells shows up when discharging a battery. For example, if one storage cell in a series circuit of many storage cells, or if the parallel-connected cells of a group in series with other groups, is already discharged, then the discharge current of the not yet discharged cells of the battery acts on the already discharged cells like an extraneously impressed current.

To assure the uniform charging and discharging of the storage cells of a battery, at least one protective element is connected in parallel with each storage cell in the series, or with each group of storage cells. This protective element by-passes the current flow of the storage cell(s) when it reaches a predetermined, maximal charge or discharge. In addition, this protective element is in connection with a control switch which is directly conductively connectible with the negative and positive electrodes of these storage cell(s) and the electrical connecting poles. The protective element is directly attached to both connecting poles, while the storage cell(s) is/are at least connected to one of the two connecting poles or terminals of the battery through a switch. The advantage of the circuit disclosed in the related application lies in the fact that with this circuit each storage cell of the battery can be charged to its maximal capacity. Furthermore, it also permits use of the storage cells in the battery which are in a different charging-state than the remainder of the storage cells, because with this circuit it is possible to achieve synchronization of these storage cells with the rest of the series string of individual or groups of storage cells in parallel. When storage cells are connected in parallel to form a group, due to equalizing current within the group, the same charge-condition exists in all storage cells.

The instant invention relates to an improvement and further development of the circuit described in the related application.

A certain disadvantage of the circuit disclosed in the related application can be seen in the fact that the adaptation to the threshold voltage and interior resistance of the storage cell(s) is often only possible by the series connection of several protective elements of the circuit. Furthermore, the elements used in the circuit are temperature sensitive, so that a direct installation of the circuit in the battery is not possible.

SUMMARY OF THE INVENTION

An object of the invention is to provide a circuit with a protective element for an electrochemical storage cell, or several parallel-connected storage cells of a group in such a manner that, at the series connection of several storage cells, or such groups of parallel-connected storage cells to form a battery, the complete charging of each storage cell to its maximal capacity becomes possible, and the protective element can be adapted in a simple manner to the maximal charging-discharging voltage of a storage cell or a group of parallel-connected storage cells. Furthermore, the circuit should prevent the overcharging of each storage cell in the battery.

With the foregoing and other objects in view, there is provided in accordance with the invention a circuit for uniform charging and discharging of electrochemical storage cells of the alkali metal and chalcogen type, connected together to form a battery in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective element shunted across each said series-connected cell which bridges the circuit through said series-connected cell upon said series-connected cell reaching a given maximum charge or discharge, a switch conductively connectible to the negative and positive electrodes of said series-connected cell and to the terminals of the battery, said protective element directly connected to said terminals of the battery, said series-connected cell having one of its electrodes connected to one of said terminals through said switch, the improvement comprising said protective element is a container whose outer surface forms an anode, and which container is filled with a chemical compound which easily dissociates and easily recombines, and an electrically conducting rod extending into and outside said container, and is electrically insulated in its mounting, forms a cathode.

Other features which are considered as characteristic for the invention are set forth in the appended claims.

Although the invention is illustrated and described herein as embodied in a circuit for protecting storage cells, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
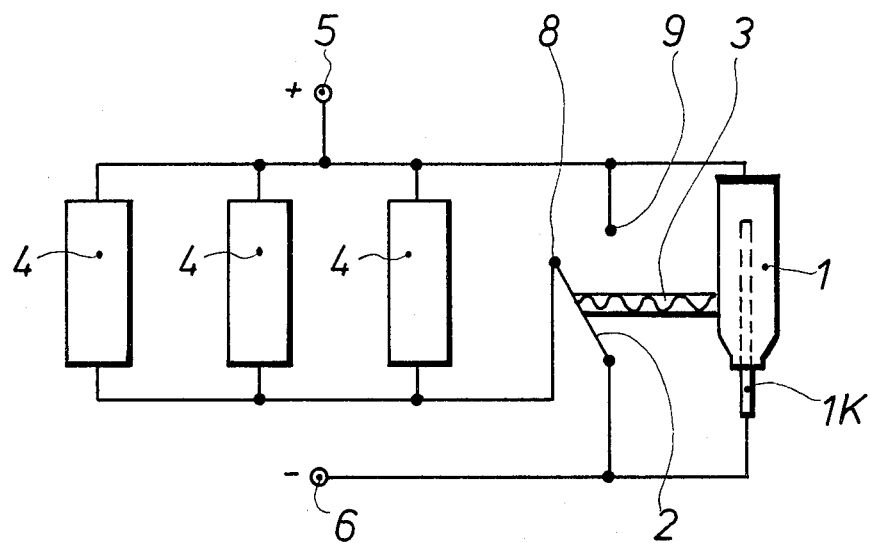
FIG. 1 illustrates a circuit with a protective element in connection with a group of three storage cells in parallel.

The protective element is in the form of a container which is filled with a chemical compound which easily dissociates and easily recombines. The outer surface of the container forms the anode. An electrical conducting rod which is electrically insulated in its mounting forms the cathode. The chemical compound which is filled into the container is a sodium hydroxide melt. The advantage offered by this chemical compound is that it readily recombines.

The container forming the protective element is made of an alloy steel. Nickel has proven itself as especially suitable. The latter is a corrosion-resisting material. This is a special advantage because sodium hydroxide melt is a very agressive substance. Preferably, the container is shaped as a shell which is closed on all sides. The container, through a heat-conducting connection, controls the switch which connects one electrode of the electrochemical storage cell(s) with one of the two electrical connecting poles. The switch can be controlled by the heat generated in the container in a simple manner so that the current flow through the electrochemical storage cell(s) is interrupted.

The rod which forms the cathode is so mounted in the container that it is electrically insulated. The rod is made of a corrosion-resistant, electrically conducting material, preferably copper. This is also a corrosion-resting material. This is especially important because the rod extends into the interior of the container and comes in contact with the sodium hydroxide melt.

It is advantageous to make the length of the rod so that, in the interior of the container, it almost touches its bottom. At the outside, the rod extends above the container so that it can be easily connected with the negative electrical connecting pole. The circuit with the protective element is placed in parallel with the single, respectively the parallel-connected storage cells, so that when reaching the maximal charging voltage of the storage cell(s) the protective element by-passes the current flow through the storage cell(s) as long as it takes to charge the remaining sotrage cells of the battery to their maximal charging voltage.

When the storage cell(s) reaches a discharge voltage below a predetermined level—which is associated with a pole reversal—the protective element takes over the current impressed from the outside. In addition, a large amount of heat is generated by the dischrage current which now flows through the protective element.

This heat is, through a heat conducting connection, carried to the switch which connects one electrode of the storage cell(s) with an electric connecting pole or terminal. This switch, which is preferably a thermoswitch, is so operable that the storage cells are completely separated from the current circuit.

It is advantageous to adjust the response limits of the protective element to the maximal charging, and the permissible discharge voltages of the storage cell(s). The protective element is stable in temperature, especially if the container is made of nickel, which has a melting point of 1453° C., and the sodium hydroxide melt inside starts to melt only at 138° C. If necessary, the protective element can be located inside of the battery together with the other component of the circuit.

Furthermore, the protective element can be manufactured relatively inexpensively, because nickel and sodium hydroxide are only comparatively inexpensive materials.

In the following, the invention will be explained with the aid of the drawings and the advantages achieved by the invention will be described.

The circuit shown in FIG. 1 consists of a protective element 1, a switch 2, a heat conducting connection 3, three electro-chemical storage cells 4, and negative and positive electrical connecting poles 5 and 6. The three storage cells 4 are connected in parallel and form a group. Such a group can be combined with additional groups containing at least one storage cell or several parallel-connected storage cells, in the form of a series circuit to form a battery.

The protective element 1 built into this circuit is a container which is filled with a chemical compound. The container is formed as a shell which is closed on all sides and made of an alloy steel, preferably nickel. A sodium hydroxide melt is filled into the container 1. At one end, the container 1 is provided with an opening in which a rod 1K is inserted. This rod is made of a corrosion-resisting material, preferably copper, and mounted electrically insulated in the opening, so that the interior of the container is completely closed to the outside. The first end of this rod 1K extends into the container to an extent that it almost touches the container bottom. The other or second end of the rod extends beyond the container 1 about a few millimeters. The outer surfaces of container 1 form the anode, while the rod 1K functions as the cathode. The anode of the protective element is connected to the positive connecting pole 5, while the cathode 1K is in connection with the negative connecting pole 6. In addition, the protective element 1 is in connection with the switch 2 through the heat conducting connection 3. This switch is preferably made as a thermo-switch. The switch 2 is in this embodiment connected to the negative electrical connecting pole. The electrical contact of switch 2 is connected to a terminal 8 to which the negative electrodes of the storage cells 4 are connected to the positive electric connecting pole 5. A further contact point 9 is in connection with the positive electrodes of the storage cells 4 and the connecting pole 5. The electric contact of switch 2 can also be connected to this contact point 9. In the normal operating state of the battery, the switch 2 is always in connection with the contact point 8. Through the effect of heat, the electrical contact of switch 2 with contact point 8 can be opened, and connected to contact point 9.

Figure 2:
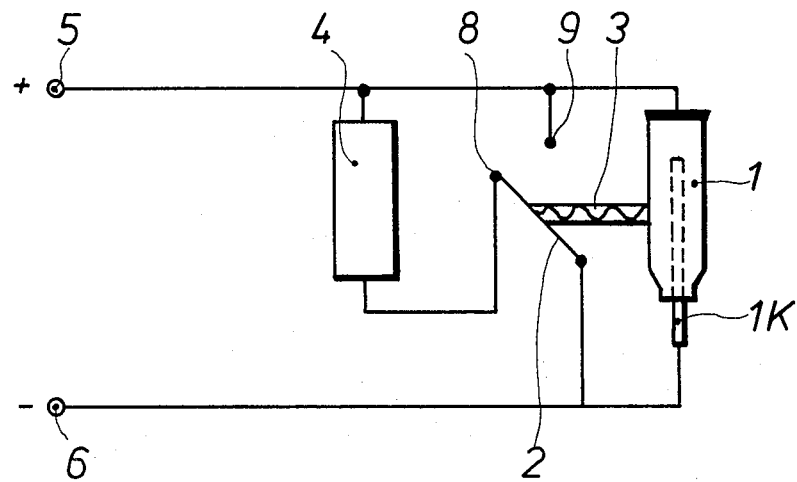
FIG. 2 shows the same circuit as in FIG. 1, connected, however, to one storage cell.

As shown in FIG. 2, the circuit according to the invention can not only be used for several parallel-connected storage cells, but also for a single storage cell. Again, the circuit comprises a protective element 1, a switch 2, a heat conducting connection 3, and the electrochemical storage cell 4. The protective element is constructed in the same way as the protective element shown in FIG. 1. The outer surfaces of the protective element 1 serve as the anode, and are connected to the positive electrical connecting pole 5. The cathode 1K of the protective element 1 is connected with the negative electrical connecting pole 6. The protective element 1 is in connection with the switch 2 through the heat-conducting connection 3. The electrical contact of switch 2 is connected with contact point 8, to which the negative electrode of the storage cell 4 is also connected. The positive electrode of the storage cell 4 is attached to the positive electric connecting pole 5. A further contact 9 is in connection with said connecting pole 5 and the positive electrode 4 of the storage cell. As in the typical embodiment in FIG. 1, in normal operation, the electrical contact of switch 2 is connected with contact point 8.

Figure 3:
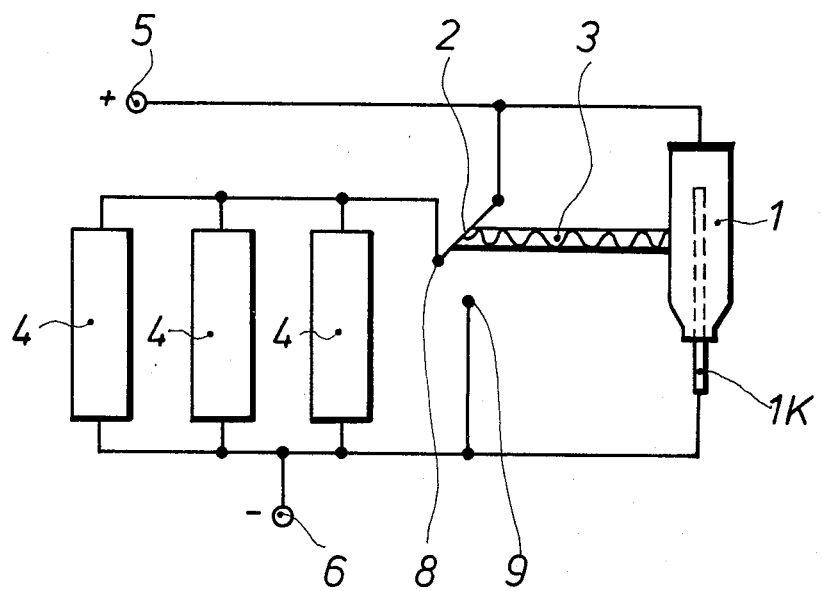
FIG. 3 is a variation of the circuit shown in FIG. 1, and FIG. 4 graphically shows the idealized characteristic current-voltage curve of a storage cell.

As FIG. 3 shows, the negative electrodes of the parallel-connected storage cells 4 can also be directly connected to the negative connecting terminal 6. In this embodiment, the positive electrodes of the storage cells 4 are, through the switch 3, connected to the positive connecting pole 5. The contact point 9, shown in FIGS. 1 and 2, is in this embodiment connected to the negative electrodes of the storage cells 4, and the negative connecting pole 6. The outer surface of the protective element 1 is again connected to the positive electrical connecting pole 5. The protective element is also shaped as a container, which is filled with a sodium hydroxide melt. Here also the cathode 1K of the protective element 1 is attached to the negative electric connecting pole 6. The protective element is in contact with the switch 2 through a heat conducting connection 3. The positive electrodes of the storage cells 4 are connected to the contact point 8, to which switch 2 is connected during normal operation.

In the following, the operation of the protective circuit shown in the FIGS. 1 to 3 will be explained in detail. The idealized current voltage characteristic curve, shown in FIG. 4, serves for a better understanding of the mode of operation of the protective circuit and the storage cells. In order that the protective circuit functions properly, the protective element 1 contained in it should have the same characteristic curve as the storage cells 4. The operation of the protective circuit is always the same, regardless if it is connected to a single storage cell, or a group of several, parallel-connected storage cells. Therefore, in the following, reference is made only to the arrangements shown in FIGS. 1 and 3. However, all statements also apply to the arrangement shown in FIG. 2.

To charge the group with the three parallel-connected storage cells 4, a current source (not shown) is attached to the connecting poles 5 and 6. This source supplied the negative charging current $I_1$ shown in FIG. 4. When all storage cells have reached the voltage value A in FIG. 4, they are charged to their maximal capacity. An equalizing current flows between the several parallel-connected storage cells 4 of a group, which causes all storage cells 4 to be in uniform charged condition. By the charging, the ohm-value of the storage cell 4 becomes high, i.e. the current flowing through them becomes less. During charging, the voltage of the storage cells 4 can rise maximally to the value marked B. As can be seen from the diagram in FIG. 4, only a very small negative current $I_m$ flows through the storage cell now. This means that other groups of storage cells connected in series with this group, and which are not yet completely fully charged to their maximal capacity, are not charged further. In other words, this means that in a series arrangement the group of storage cells with the lowest capacity determines the total capacity of all storage cells of the battery.

The complete charging of all groups of parallel-connected storage cells 4 which are arranged in series is made possible by connecting a circuit according to the invention to each of the groups forming the battery. The protective circuit shown in FIG. 1 contains the above-mentioned protective element 1. The charging current $I_1$ is conducted through the storage cells 4 until they are charged to their maximal capacity. The protective element of the circuit is so designed that it acts as a resistance until this maximal charging voltage is reached, so that no current flows through it. When the storage cells have reached their maximal charging voltage, especially the voltage marked B in FIG. 4, the protective element takes over the current, and in this manner bridges (by-passes) the current circuit through the storage cells 4.

The charging current $I_m$ which flows now through the protective element which is consturcted as a container causes a continuous dissociation and re-combination of the sodium hydroxide melt in the container, whereby heat is generated.

The chemical reactions follow the following equations:

Dissociation: $4\,NaOH \longrightarrow 4\,Na + 2\,H_2O + O_2$

Recombination: $2\,Na + 2\,H_2O \longrightarrow 2\,NaOH + O_2 + H_2$ $H_2 + \tfrac{1}{2} O_2 \longrightarrow H_2O$ For augmenting the last reaction steps, catalysts, such as platinum asbestos or Raney-nickel, can be added in small amounts.

Because the charging current $I_m$ flowing through the protective element 1 is relatively small, the amount of heat generated is also small, so that the switch 2 which is in contact with the protective element through the heat-conducting connection 3, is not activated. Therefore, the response of the protective element 1 gives exact information about the point in time when the group of storage cells 4 is fully charged. By attaching an indicating device to the protective element, this time point can be noted, and optically displayed.

With the circuit according to the invention, the current from the already charged group of storage cells 4 is by-passed until all groups, respectively, all storage cells of a battery are charged to their maximal capacity.

Figure 4:
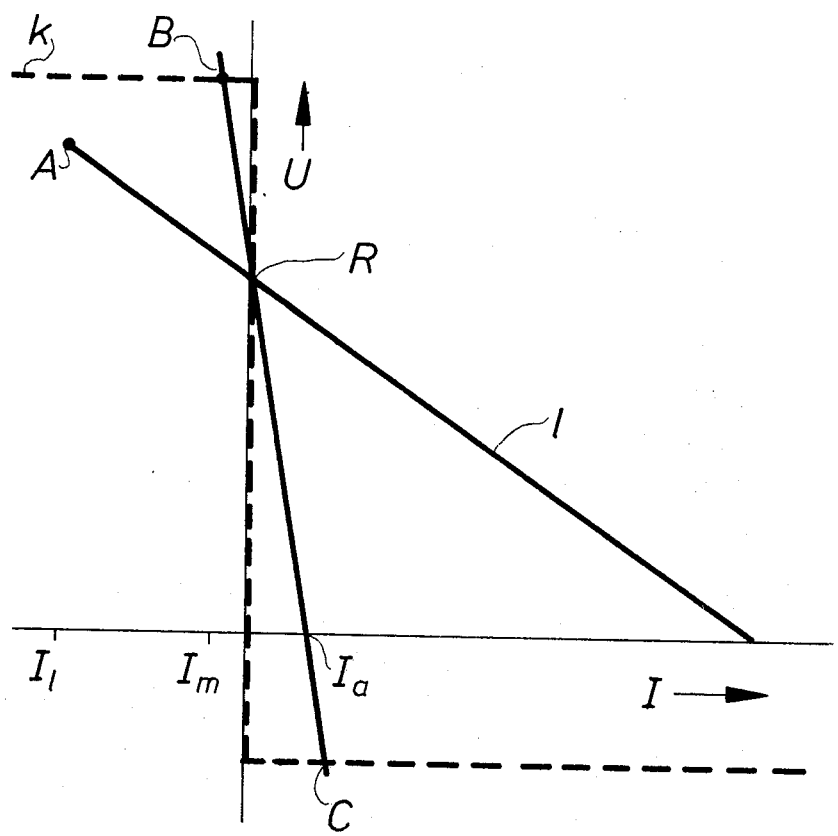

The intersection of the curve 1 in FIG. 4, which shows the instantaneous charging condition of the storage cell 4, with the ordinate U is designated as the resting voltage R of the storage cell.

If the storage cells 4 have the resting-voltage R shown in FIG. 4, a load is put on the newly charged battery again, and then the voltage of the storage cell 4 drops again below the response voltage of the protective element 1. The by-pass of the current circuit of the storage cells 4 is removed thereby. The current flow between the electrical connecting poles 5 and 6 again goes through the storage cells 4.

If such a group of storage cells having the resting voltage R is continuously under load, a discharge current is flowing, and the voltage of the storage cells 4 is decreasing, until it reaches a zero value, and a short-circuit current results. If at this time, the storage cells arranged in series with this group are not completely discharged, a discharge current $I_a$, shown in FIG. 4, is forced from the outside on these already discharged groups. This current causes a pole reversal of the cell voltage, i.e. the latter has a negative effect, and can, for example, reach the value marked in the diagram with C. As already mentioned above, the protective element in the protective circuit is so constructed that it responds again when reaching a predetermined discharge voltage, and by-passes (bridges) the currentflow through the storage cells. The discharge current $I_a$ which is forced from the outside and flows now through the protective element 1 is relatively large. It causes thereby a dissociation and re-combination of the sodium-hydroxide melt. Simultaneously, a relatively large amount of heat is generated. The latter is conducted to the switch 2 through the heat conducting connection 7. This switch is constructed as a thermo switch, and is triggered by the heat it received. Its electrical contact with the contact point 8 is opened, and connected with the contact point 9. Thereby, the storage cells are completely separated from current circuit, and protected from damage. The complete discharging of the remaining, still partly charged storage cells 4 of the battery can be continued without disturbance.

In order to disconnect the electrically conducting contact of switch 2 from contact point 8, the heat which is conducted away from the protective element 1 through the connecting line 3, for example, is applied to a bi-metal which controls the electrically conducting contact of the switch 2. Also other heat controlled elements could be used for the operation of the electrical contact. The connection of the switch 2 with the contact point 9 can be limited with respect to time or be continuous. The protective circuit can be so constructed that the connection of switch 2 with contact point 9 is irreversible. This is the case when the electrically conducting contact of the switch is controlled by a melt-fuse. This means that the endangered storage cell group can only be again put in operation by work done in the factory, after all storage cells have been checked and recharged. However, the circuit can also be made so that the switch 2 is only connected with the contact point 9 for a limited time, i.e. an excessive discharging for a short time can be remedied by reducing the current, a rest period, and recharging.

There is claimed:

1. Circuit for uniform charging and discharging of electrochemical storage cells of the alkali metal and chalcogen type, connected together to form a battery in which series-connected cells having positive and negative electrodes as individual cells or groups of several parallel-connected storage cells are series-connected to form a battery having a positive terminal and a negative terminal, with the cell having an anode chamber for containing alkali metal anolyte and a cathode chamber for containing chalcogen catholyte, with the anode chamber separated from the cathode chamber by an alkali ion-conducting solid electrolyte, a protective element shunted across each said series-connected cell which bridges the circuit through said series-connected cell upon said series-connected cell reaching a given maximum charge or discharge, a switch conductively connectible to the negative and positive electrodes of said series-connected cell and to the terminals of the battery, said protective element directly connected to said terminals of the battery, said series-connected cell having one of its electrodes connected to one of said terminals through said switch, the improvement comprising said protective element is a container whose outer surface forms an anode, and which container is filled with a chemical compound which easily dissociates and easily recombines, and an electrically conducting rod extending into and outside said container, and is electrically insulated in its mounting, forms a cathode.

2. Circuit according to claim 1, wherein the chemical compound is a sodium-hydroxide melt.

3. Circuit according to claim 1, wherein the outer surface of the container is made of an alloy steel.

4. Circuit according to claim 2, wherein the outer surface of the container is made of an alloy steel.

5. Circuit according to claim 1, wherein the outer surface of the container is made of nickel.

6. Circuit according to claim 2, wherein the outer surface of the container is made of nickel.

7. Circuit according to claim 1, wherein the container is formed as a shell which is closed on all sides and is provided with an opening for the cathode rod.

8. Circuit according to claim 2, wherein the container is formed as a shell which is closed on all sides and is provided with an opening for the cathode rod.

9. Circuit according to claim 1, wherein said container is in contact by a heat conducting line with said switch which connects one electrode of said electrical storage cell with a terminal.

10. Circuit according to claim 1, wherein said rod which forms the cathode is made of a corrosion resistant material.

11. Circuit according to claim 2, wherein said rod which forms the cathode is made of a corrosion resistant material.

12. Circuit according to claim 10 or claim 11, wherein said rod is made of copper.

* * * * *